NON-THRESHOLD DIGITAL AND GATE HAVING INPUTS CORRESPONDING IN NUMBER TO TUNNEL DIODES IN PARALLEL INPUT NETWORK
Filed Sept. 8, 1961 3 Sheets-Sheet 1

AN ILLUSTRATIVE EMBODIMENT OF THE PRESENT INVENTION

INVENTOR
G. A. BACKMAN
BY Lucian C. Canepa
ATTORNEY

INVENTOR
G. A. BACKMAN
BY Lucian C. Canepa
ATTORNEY

INVENTOR
G. A. BACKMAN
BY Lucian C. Canepa
ATTORNEY

United States Patent Office 3,152,266

Patented Oct. 6, 1964

3,152,266

NON-THRESHOLD DIGITAL AND GATE HAVING INPUTS CORRESPONDING IN NUMBER TO TUNNEL DIODES IN PARALLEL INPUT NETWORK

Gustav A. Backman, Franklin Township, Somerset County, N.J., assignor to Bell Telephone Laboratories, Incorporated, New York, N.Y., a corporation of New York Filed Sept. 8, 1961, Ser. No. 136,874
10 Claims. (Cl. 307—88.5)

The present invention relates to the data processing field in general, and more particularly to an AND logic gate employing negative resistance voltage-controlled diodes, such as, for example, tunnel diodes.

Tunnel diode AND gates, i.e., circuits which generate an output in response to the simultaneous occurrence of all the input variables, are well known in the digital information processing art. Typically, such configurations employ a tunnel diode biased on the first positive resistance portion of its characteristic curve by a resistor and voltage source connected in series therewith. The inputs are applied directly to the tunnel diode such that each tends to move the operating point closer to the peak point of its voltage-current characteristic, and when all inputs are concurrently applied the diode will switch states, thereby generating an output. Such operation is shown, for example, in FIG. 2 of an article by J. C. Miller et al. on pages 52 and 53 in the Digest of Technical Papers presented at the International Solid-State Circuits Conference, in Philadelphia, 1960. This type of circuit is said to be a coincident threshold-operated AND gate as the sum of all inputs simultaneously applied will switch the tunnel diode, while any fewer number of inputs is not sufficient to cause the diode to change states. This mode of operation disadvantageously imposes a close tolerance on both the magnitude of the input signals and the allowable variations permitted in the peak point of the tunnel diode's voltage-current characteristic.

It is therefore an object of this invention to provide an improvement in the digital information processing art. More specifically, it is an object of this invention to provide a non-threshold AND logic gate.

It is another object of the present invention to provide an AND circuit which is characterized by extremely high speed, low power and high reliability.

It is a further object of the present invention to produce an AND logic gate which will accept either coincident or noncoincident inputs.

These and other objects of the present invention are realized in a specific illustrative embodiment thereof which employs a network with $n$ parallel branches corresponding to an $n$-input AND gate. Each of these branches contains a resistor serially connected to a negative resistance input diode of the voltage-controlled type. The composite network, containing $n+1$ positive resistance regions and $n$ negative resistance regions, is further connected in series with an output tunnel diode and a voltage source, completing an electrical path.

The resulting configuration has $n+1$ stable operating points, $n$ of which correspond to the output diode being operated on the high voltage positive resistance region of its characteristic, and one corresponding to low voltage conduction. This latter state is a result of all the input diodes being in their high conduction states, while at the other $n$ operating points, at least one input tunnel diode is in the low voltage conduction state.

The Boolean Truth Table so generated in accordance with the principles of the present invention yields AND logic if a low voltage output corresponds to the desired or "1" binary state.

It is therefore a feature of the present invention that an $n$-input non-threshold AND logic gate include a network comprising $n$ parallel branches, each branch including the series connection of a negative resistance diode of the voltage-controlled type and a resistor, to formulate a voltage-current characteristic which contains $n+1$ positive resistance regions and $n$ negative resistance regions.

It is another feature of the present invention that a network containing a plurality of parallel branches, each branch including an input tunnel diode and a resistor serially connected thereto, be connected in series with a voltage source and an output voltage-controlled, negative resistance diode.

It is still another feature of the present invention that a network comprising $n$ parallel branches, each branch including a tunnel diode and a resistor, employ an output tunnel diode as a load such that $n+1$ stable operating conditions are so formed.

A complete understanding of the present invention and of the above and other features and advantages thereof may be gained from a consideration of the following detailed description of illustrative embodiments thereof presented hereinbelow in connection with the accompanying drawing, in which.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P–N Junctions," L. Esaki, Physical Review, volume 109, January–March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Application," M. E. Hines, The Bell System Technical Journal, Volume 39, May 1960, pages 477–513.

The tunnel diode comprises a p–n junction having an electrode connected to each region thereof, and is similar in construction to other semiconductor diodes used for such various purposes as rectification, mixing and switching. The tunnel diode, however, requires two unique characteristics of its p-n junction: that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Figure 1:
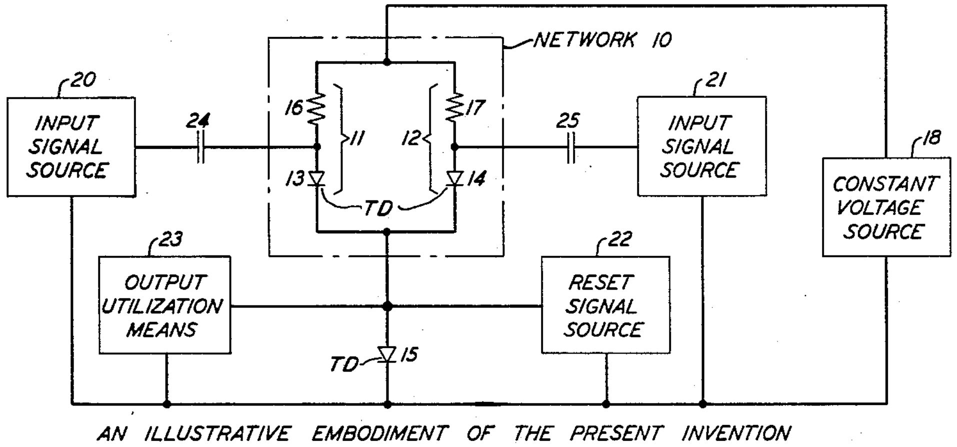
FIG. 1 is a schematic diagram showing a specific illustrative AND logic gate made in accordance with the principles of the present invention.

Referring now to FIG. 1, there is shown a specific illustrative AND logic gate which embodies aspects of the principles of the present invention. The circuit includes a network 10 which comprises two parallel branches 11 and 12, each branch in turn including an input tunnel diode 13 or 14, and a series-connected resistor, 16 or 17, respectively. This network is further connected in series to an output tunnel diode 15, which is of an aiding polarity with each of the input diodes. A constant voltage source 18 electrically completes the series circuit as shown.

Further, the circuit of FIG. 1 is shown as including two input signal sources, 20 and 21, each connected in parallel with the series circuit comprising a separate one of the input diodes 16 and 17 and the output diode 15. Also, output utilization means 23 and a reset signal source 22 are shown in parallel with the output tunnel diode 15. The output utilization means may be, for example, a further logic stage, or a vacuum tube or transistor amplifier, all well known in the art. The only restriction is that the means 23 have an input impedance which is large compared to the magnitudes of the resistors 16 and 17 employed in the circuit.

Figure 2A:
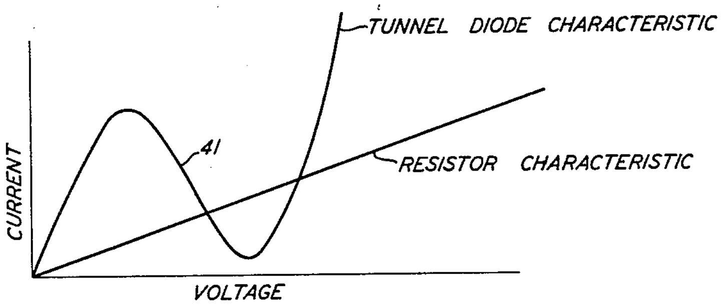
FIG. 2A illustrates the voltage-current characteristic curve of a negative resistance diode of the type included in the network of FIG. 1, and also the characteristic of a resistor.
Figure 2B:
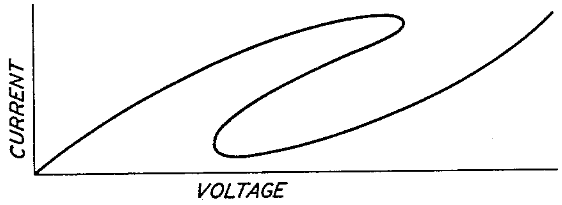
FIG. 2B illustrates the voltage-current characteristic of the series combination of a tunnel diode and a resistor as found in each parallel branch of the network 10 shown in FIG. 1.

The voltage-current characteristic of a tunnel diode is illustrated in FIG. 2A. The resistors 16 and 17 associated with input diodes 13 and 14, respectively, are so chosen as to be larger than the magnitude of the negative resistance slope 41 of the diode charcteristic shown in FIG. 2A, the characteristic of such a resistor being also illustrated therein. Such a resistor-diode series circuit has the characteristic shown in FIG. 2B. This is derived in the usual manner by assuming various values of current flowing through both of the series elements and plotting all possible voltage values across the combination at each chosen current value.

Figure 2C:
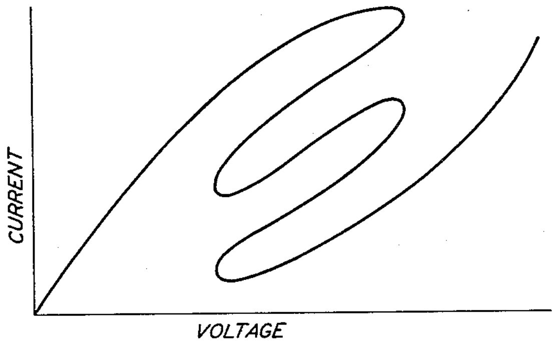
FIG. 2C illustrates the voltage-current characteristic of a network which includes two parallel branches, each branch having the characteristic shown in FIG. 2B.

Two of these subcombinations are connected in parallel to form network 10, which has the desired characteristic shown in FIG. 2C. This characteristic is obtained by assuming various voltage values across the parallel combination and then plotting all possible current sums through the two individual branches.

Figure 3:
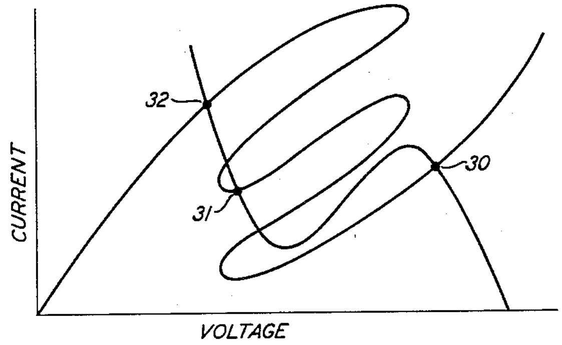
FIG. 3 illustrates the voltage-current characteristic depicted in FIG. 2C upon which a voltage-controlled negative resistance diode load line is superimposed.

The composite characteristic is reillustrated in FIG. 3 upon which the load line formed by output tunnel diode 15 and voltage source 18 is superimposed. Note that the positive resistance regions of the composite characteristic intersect the positive resistance portions of the output diode load line at three points, 30, 31 and 32. These correspond to stable operating conditions.

At point 32 tunnel diodes 13 and 14 are in their low voltage conduction conditions, whereas output diode 15 is in its high voltage state. Similarly, output diode 15 is in its high state at intersection 31, while either one of the input tunnel diodes 13 or 14, but not both, is in its high conduction state. If both the input diodes are simultaneously in their high potential condition, stable intersection 30 results, and the output takes on its relatively low voltage value. These combinations of diode voltage conditions are illustrated in Table I below:

*Table I*

| Input Tunnel Diode 13 | Input Tunnel Diode 14 | Output Tunnel Diode 15 | Corresponding Intersection in FIG. 3 |
|---|---|---|---|
| Low | Low | High | 32 |
| Low | High | High | 31 |
| High | Low | High | 31 |
| High | High | Low | 30 |

This table clearly indicates AND logic wherein the output tunnel diode 15 will be in its low condition only in response to both input diodes being in their high voltage conduction conditions.

Figure 4A:
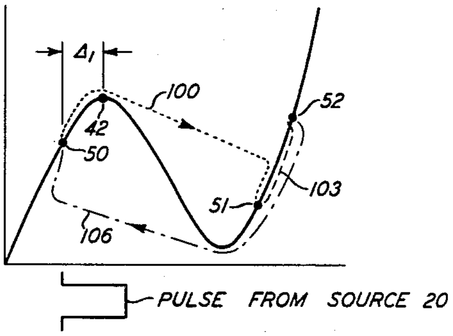
FIG. 4A illustrates the voltage-current characteristic curve of tunnel diode 13 of FIG. 1 and indicates the switching action that the diode undergoes during circuit operation.
Figure 4B:
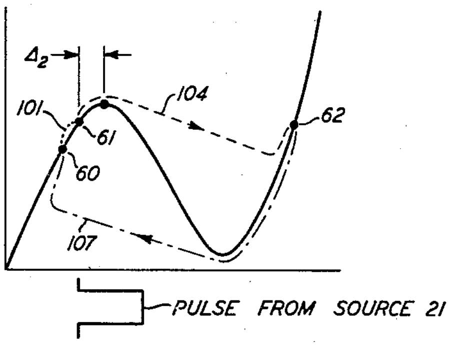
FIG. 4B illustrates the voltage-current characteristic curve of tunnel diode 14 of FIG. 1 and indicates the switching action that the diode undergoes during circuit operation.
Figure 4C:
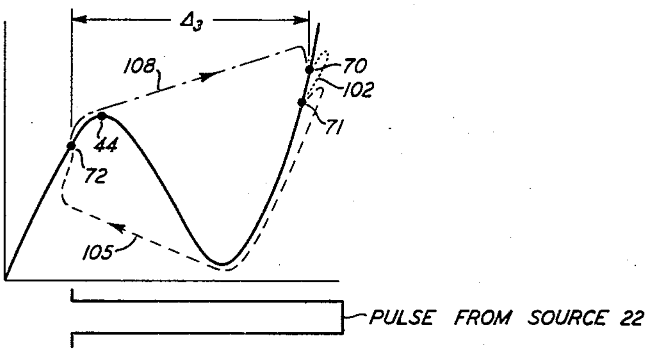
FIG. 4C illustrates the voltage-current characteristic curve of tunnel diode 15 of FIG. 1 and indicates the switching action that the diode undergoes during circuit operation.

A typical cycle of sequential operation will now be described. Assume each of the input signal sources 20 and 21 is nonactivated, and input diodes 13 and 14 are at points 50 and 60 on their operating curves as shown in FIGS. 4A and 4B, respectively. Output diode 15 is then at point 70 as illustrated in FIG. 4C. This set of conditions corresponds to intersection 32.

Let input source 20 now supply a voltage pulse greater than a minimum magnitude $\Delta_1$ as shown in FIG. 4A. This pulse is of sufficient amplitude for the operating point of diode 13 to pass the peak point 42 on its characteristic curve and it will therefore switch to its high voltage positive resistance region and finally reside at point 51 following the dotted path 100. Similarly, the other diodes will also change operating points following the dotted paths 101 and 102 and reside at points 61 and 71, respectively, as shown in FIGS. 4B and 4C. Referring to FIG. 3, this corresponds to stable intersection 31.

If at the same or a later time an input voltage signal from source 21 of magnitude $\Delta_2$, or greater, illustrated in FIG. 4B, is supplied to diode 14, it will also switch to its high voltage condition following the dashed curve 104 thereto until point 62 is reached. Also, output tunnel diode 15 will change from its high voltage condition to point 72 on its low conduction region following the dashed curve 105. Thus the diodes 13, 14 and 15 will reside at points 52, 62 and 72, respectively, corresponding to the stable intersection 30. The output voltage thereby changes from its relatively high value to its relatively low value as shown in FIG. 1A.

Sequential circuit operation, as developed to this point, illustrates that AND logic is performed by requiring that both input diodes 13 and 14 be in their high voltage conduction states in order that an output may be generated, which output is defined as being the change of the output diode 15 to its low voltage state. The operation has been discussed in terms of both instantaneous circuit changes as illustrated in FIGS. 4A, 4B and 4C and also in terms of stable quiescent operating points as depicted in FIG. 3.

Following the generation of an output, the circuit will remain in the condition corresponding to intersection 30, which is to say, points 52, 62 and 72 in FIGS. 4A, 4B and 4C, respectively, thereby necessitating a reset signal source 22 which acts in parallel with output diode 15. Each reset signal pulse supplied has a magnitude $\Delta_3$ or greater, as shown in FIG. 4C. This voltage is sufficient to pass the diode's peak point 44 and reset the diode to point 70 on its high voltage region following the dashed-dotted path 108. Similarly, diodes 13 and 14 also follow dashed-dotted paths 106 and 107 and return to their original points 50 and 60, respectively.

Figure 1A:
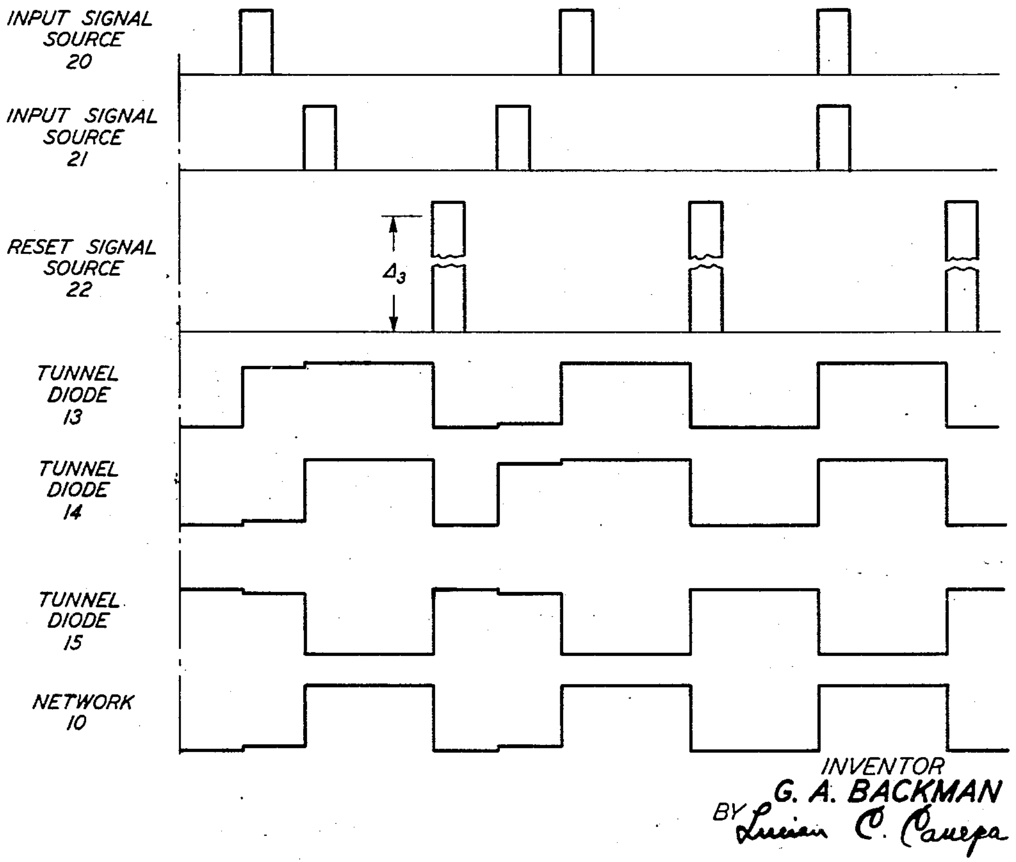
FIG. 1A depicts the input and output waveforms of various components of the circuit of FIG. 1.

The sequence of applied voltages described, along with the resulting voltages across each of the tunnel diodes is shown in FIG. 1A wherein the waveforms corresponding to three illustrative cycles of operation are depicted. The waveform for each of the applied voltages is shown as being a rectangular pulse. This is done only for the sake of being definite, and it should be understood that the only requirement on the input and reset signals is that their amplitudes be not less than the appropriate critical magnitude $\Delta_1$, $\Delta_2$ or $\Delta_3$. Also, as a practical matter, both of the input signals would be of a greater amplitude than either $\Delta_1$ or $\Delta_2$ to render the order of received signals irrelevant, and circuit operation more reliable. Simultaneous reception of input signals would therefore also be an allowable case.

In accordance with the principles of this invention, the circuit as described above may be generalized to an n-input AND logic gate. To accomplish this, network 10 is generalized to contain $n$ branches, each branch containing a voltage-controlled negative resistance diode and a resistor in series therewith. This new combination will have a voltage-current characteristic as illustrated in FIG. 3 modified to contain $n+1$ positive resistance and $n$ negative resistance regions. The circuit operation is not presented in detail as it exactly parallels the case described wherein $n=2$.

One illustrative set of values for the components of the circuit shown in FIG. 1 is as follows: negative resistance diodes 13, 14 and 15 each—20 milliamperes peak current, germanium type tunnel diode; resistors 16 and 17 each—24 ohms; source 18—+2 volts, input impedance of the output utilization means 23—100 ohms or greater.

It is emphasized that although particular attention herein has been directed to the use of tunnel diodes as the negative resistance diodes of the above-described circuits, other two-terminal voltage-controlled negative resistance arrangements having characteristics of the general type shown in FIG. 2A may also be used therefor.

It is to be understood that the above-described arrangements are only illustrative of the application of the principles of the present invention. Numerous other arrangements may be devised by those skilled in the art without departing from the spirit and scope of this invention. For example, a resistor approximately equal in magnitude to the negative resistance of tunnel diode 15 may be connected in shunt with the diode 15 to create a load line as in FIG. 3 which has lower values of positive resistance, i.e., steeper slopes, and no negative resistance region. Also, the capacitors 24 and 25 illustrated in FIG. 1 may be replaced by other coupling means including transformers or a direct-current connection.

A further variation on the basic illustrative embodiment is to derive the output voltage across network 10, which output is then the complement of that formerly measured across the output tunnel diode 15. This may be clearly understood by referring to FIG. 3 wherein the intersections 31 and 32 correspond to a relatively low voltage across network 10 while intersection 30 denotes a relatively high voltage. The condition of both input tunnel diodes and the output voltage is illustrated in Table II below:

*Table II*

| Input Tunnel Diode 13 | Input Tunnel Diode 14 | Output Voltage Across Network 10 | Corresponding Intersection in FIG. 3 |
|---|---|---|---|
| Low | Low | Low | 32 |
| Low | High | Low | 31 |
| High | Low | Low | 31 |
| High | High | High | 30 |

Boolean AND logic is clearly indicated as the network 10 is in its high voltage condition only in response to both input diodes also being in their high voltage states.

What is claimed is:

1. In combination in an $n$-input non-threshold AND logic gate, a series circuit comprising a constant voltage source, an output voltage-controlled negative resistance diode, and a network, said network including $n$ branches, each of said branches comprising an input voltage-controlled negative resistance diode and a resistor connected in series therewith.

2. A combination as in claim 1 further including $n$ individual input signal sources in one to one correspondence with said input voltage-controlled negative resistance diodes, each of said sources being connected in parallel with that portion of the series circuit which comprises the output voltage-controlled negative resistance diode and the one input voltage-controlled negative resistance diode to which the input source corresponds.

3. A combination as in claim 2 further comprising a reset signal source which is connected in parallel with said output negative resistance voltage-controlled diode.

4. A combination as in claim 3 still further comprising output utilization means connected in parallel with said output negative resistance voltage-controlled diode.

5. A combination as in claim 4 wherein all the voltage-controlled negative resistance diodes are tunnel diodes.

6. In combination in an $n$-input non-threshold AND logic gate, where $n$ is any positive integer greater than 1, a series circuit comprising a first circuit means, a voltage source, and a second circuit means, said first circuit means being characterized by a voltage-current characteristic which comprises $n+1$ positive resistance regions and $n$ negative resistance regions such that the load line formed by said second circuit means and said voltage source intersects the voltage-current characteristic of said first circuit means at $n+1$ stable operating points.

7. In combination in an $n$-input non-threshold AND logic gate, a series circuit comprising a first circuit means, a voltage source, and a second circuit means, said first circuit means being characterized by a voltage-current characteristic which comprises $n+1$ positive resistance regions and $n$ negative resistance regions such that the load line formed by said second circuit means and said voltage source intersects the voltage-current characteristic of said first circuit means at $n+1$ stable operating points, wherein said first circuit means comprises a network including $n$ parallel branches, each branch including a voltage-controlled negative resistance diode and a resistor serially connected thereto.

8. A combination as in claim 7 wherein said second circuit means comprises an output voltage-controlled negative resistance diode.

9. A combination as in claim 8 further comprising a reset signal source and an output utilization means both connected in parallel with said output voltage-controlled negative resistance diode.

10. A combination as in claim 9 wherein all the voltage-controlled negative resistance diodes are tunnel diodes.

References Cited in the file of this patent

UNITED STATES PATENTS

| | | |
|---|---|---|
| 2,966,599 | Haas | Dec. 27, 1960 |
| 3,027,464 | Kosonocky | Mar. 27, 1962 |
| 3,040,190 | Buelow | June 19, 1962 |